United States Patent [19]

Nakamura

[11] Patent Number: 5,686,019
[45] Date of Patent: Nov. 11, 1997

[54] LIQUID CRYSTAL DEVICE AND LIQUID CRYSTAL APPARATUS

[75] Inventor: Katsutoshi Nakamura, Hiratsuka, Japan

[73] Assignee: Canon Kabushiki Kaisha, Tokyo, Japan

[21] Appl. No.: 728,558

[22] Filed: Oct. 9, 1996

Related U.S. Application Data

[63] Continuation of Ser. No. 442,764, May 17, 1995, abandoned.

[30] Foreign Application Priority Data

May 17, 1994 [JP] Japan ..................... 6-102720

[51] Int. Cl.$^6$ ..................... C09K 19/52; G02F 1/133
[52] U.S. Cl. ............. 252/299.01; 349/84; 349/123; 349/126; 349/128; 349/132; 349/133; 349/135; 349/187; 428/1
[58] Field of Search ............ 252/299.01; 349/84, 349/123, 126, 128, 132, 133, 135, 187; 428/1

[56] References Cited

U.S. PATENT DOCUMENTS

| | | | |
|---|---|---|---|
| 4,367,924 | 1/1983 | Clark et al. | 350/334 |
| 5,153,755 | 10/1992 | Higa | 359/75 |
| 5,262,082 | 11/1993 | Janulis et al. | 252/299.01 |
| 5,298,297 | 3/1994 | Takei | 428/1 |
| 5,320,883 | 6/1994 | Asaoka et al. | 428/1 |
| 5,381,256 | 1/1995 | Hanyu et al. | 359/75 |
| 5,400,159 | 3/1995 | Takao et al. | 359/76 |
| 5,576,864 | 11/1996 | Takao et al. | 349/123 |

FOREIGN PATENT DOCUMENTS

| | | |
|---|---|---|
| 0219965 | 4/1987 | European Pat. Off. . |
| 0538841 | 4/1993 | European Pat. Off. . |
| 56-107216 | 8/1981 | Japan . |
| 60-263921 | 12/1985 | Japan . |
| 62-111236 | 5/1987 | Japan . |
| 62-235928 | 10/1987 | Japan . |

OTHER PUBLICATIONS

Molecular Crystals & Liquid Crystals, vol. 202 (Jul. 1991) pp. 123–147.

"Voltage-dependent optical activity of a twisted nematic liquid crystal," M. Schadt & W.Helfrich, Appl. Phys. Lett., V.18(4), 15 Feb. 1971, pp. 127–128.

"Tristable Switching in Surface stabilized Ferroelectric liquid crystals with a large spontaneous polarization", A.D.L. Chandani et al., Japanese Journal of Applied Physics, vol. 27 #5, May 1988, pp. L729–L732.

*Primary Examiner*—Shean C. Wu
*Attorney, Agent, or Firm*—Fitzpatrick, Cella, Harper & Scinto

[57] ABSTRACT

A liquid crystal device is constituted by a first substrate and a second substrate disposed opposite to each other, and a liquid crystal lacking cholesteric phase disposed between the first and second substrates. The first substrate has a surface contacting the liquid crystal showing a surface energy $\gamma_1$ (dyne/cm) and the second substrate has a surface contacting the liquid crystal showing a surface energy $\gamma_2$ (dyne/cm) satisfying $\gamma_1 > \gamma_2$. The surface of the first substrate is provided with a film of a polyimide or an aromatic polyamide, and the surface of the first substrate having been selectively subjected to a uniaxial aligning treatment. As a result, the liquid crystal can assume a stable alignment state of a bookshelf structure or one close thereto having a small layer inclination angle. The resultant device can show a high contrast and a good responsiveness.

25 Claims, 6 Drawing Sheets

Iso      N*       SmA      Sm*C

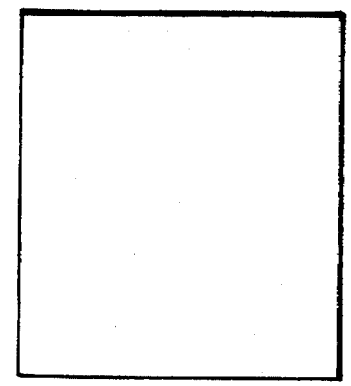
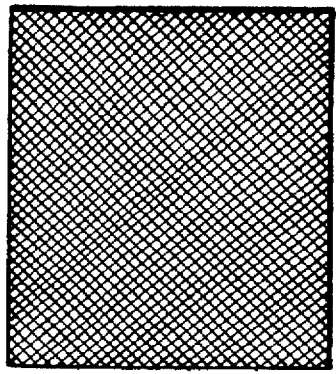
FIG. 3A  FIG. 3B  FIG. 3C  FIG. 3D
Iso | Iso/SmA MIXTURE | Iso/SmA MIXTURE | SmA

FIG. 6AA
FIG. 6AB
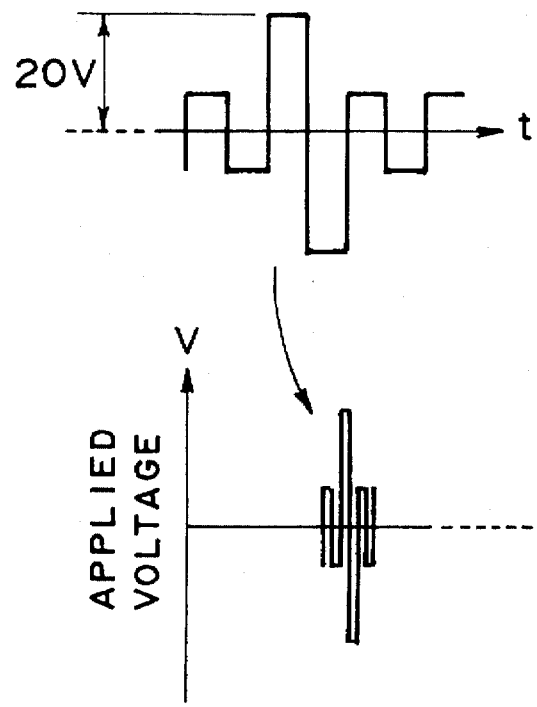
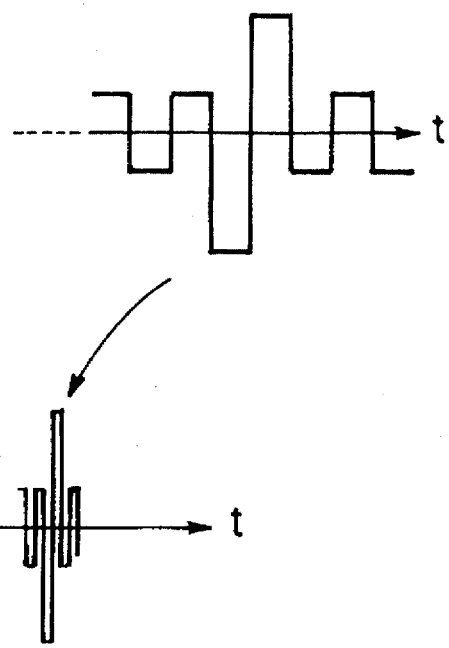
FIG. 6A
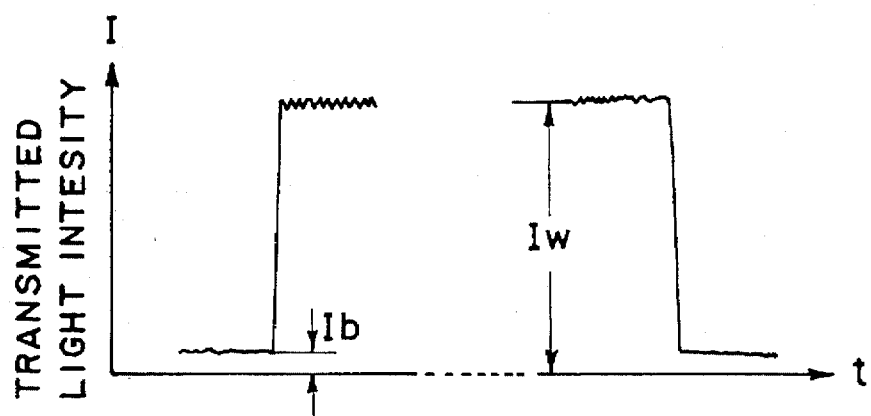
FIG. 6B

LIQUID CRYSTAL DEVICE AND LIQUID CRYSTAL APPARATUS

This application is a continuation of application Ser. No. 08/442,764, filed May 17, 1995, now abandoned.

FIELD OF THE INVENTION AND RELATED ART

The present invention relates to a liquid crystal device, particularly a chiral smectic liquid crystal device, for use in computer terminal displays, word processors, typewriter displays, television receives, view finders for video cameras, light valves for liquid crystal printers, etc., and a liquid crystal apparatus using such a liquid crystal device.

As the most widely used type of displays, CRTs (cathode ray tubes) have been widely used heretofore for motion picture displays for television receivers and video tape recorders, monitor displays for personal computers, etc. Because of its drive principle, however, a CRT is accompanied with difficulties, such as lowerings in observability due to flickering, occurrence of scanning fringes caused by resolution insufficiency, etc., and deterioration of fluorescent screens due to burning. Further, electromagnetic wave issued from a CRT has been found to exert an ill effect to human bodies, thus being liable to adversely affect the health of VDT operators. Further, a CRT structurally requires a large space behind the screen and thus detracts from space economization at office and home.

As a device solving such difficulties of the CRT, a liquid crystal display device is known. For example, there has been known a type of device using a twisted nematic (TN) liquid crystal device disclosed by M. Schadt and W. Helfrich, "Applied Physics Letters" Vol. 18, No. 4 (published Feb. 15, 1971), pp. 127–128.

As an example of a liquid crystal device using a TN-liquid crystal, a simple matrix-type liquid crystal device is known to have an advantage in respect of production cost. This type of liquid crystal device is, however, accompanied with a difficulty that the number of pixels is limited because a larger number of high-density pixels is liable to cause crosstalk during a multiplexing drive using a matrix electrode.

In recent years, in contrast with such a simple matrix-type liquid crystal, a TFT-type liquid crystal device has been developed. In this type of liquid crystal device, each pixel is provided with and driven by a transistor (TFT), the problems of crosstalk and response speed can be solved but, on the other hand, the production of a liquid crystal device without a defective pixel becomes industrially very difficult as the display size is enlarged and incurs a large production cost, even if such a large area device is possibly produced.

For improving the above-mentioned problems of the conventional types of liquid crystal devices, a display device of the type which controls transmission of light in combination with a polarizing device by utilizing the refractive index anisotropy of ferroelectric liquid crystal molecules has been proposed by Clark and Lagerwall (Japanese Laid-Open Patent Application (JP-A) 56-107216, U.S. Pat. No. 4,367,924). The ferroelectric liquid crystal is a chiral smectic liquid crystal generally having chiral smectic C phase (SmC*) or H phase (SmH*) in a specific temperature range and, in the chiral smectic phase, shows a property of assuming either one of a first stable state and a second stable state responding to an electrical field applied thereto and maintaining such a state in the absence of an electrical field, namely bistability, and also has a quick responsiveness to the change in electrical field. Thus, a chiral smectic ferroelectric liquid crystal device is expected to be utilized in a high speed and memory type display device and particularly to provide a large-area, high-resolution display in view of its excellent function. Recently, there has been also proposed a chiral smectic anti-ferroelectric liquid crystal device assuming three states (Chandani, Takezoe, et al; Japanese Journal of Applied Physics, Vol. 27, (1988) L.729-).

Such a chiral smectic liquid crystal device has been known to involve problems, such as occurrence of zig-zag alignment defects and a lowering in contrast due to a twist of liquid crystal molecules between a pair of substrates (called a splay alignment) (e.g., as disclosed in a book entitled "Structure and Physical Properties of Ferroelectric Liquid Crystals" (in Japanese) authored by Atsuo Fukuda and Hideo Takezoe, published from Corona Sha K.K. (1990). These problems has been considered to arise from the presence of two types of chevron-shaped smectic layer structures of a chiral smectic liquid crystal disposed between a pair of substrates in the device.

A method of solving the problem is to provide a pretilt angle so as to uniformly direct the chevron layer structure to one direction, thereby making the splay alignment state of liquid crystal molecules between a pair of substrates unstable in terms of elastic energy compared with the uniform alignment state.

According to another method, a liquid crystal layer structure is converted from a bent chevron structure into a bookshelf layer structure wherein smectic layers are aligned with little inclination from those perpendicular to the substrates and generally in parallel with each other or a structure close to the bookshelf layer structure, so as to realize the uniform alignment state free from zigzag defects and providing a high contrast (e.g., as disclosed in a book entitled "Liquid Crystal Displays and Liquid Crystals of Next Generation" (in Japanese), edited by Atsuo Fukuda, published from K.K. C.M.C. (1992)). A method of realizing the bookshelf layer structure is to use a naphthalene-based liquid crystal material. In this case, however, the tilt angle (a half of the angle of switching of liquid crystal molecules) is on the order of 10 degrees which is much smaller than 22.5 degrees theoretically providing a maximum transmittance and thus provides a low transmittance. Another representative method is to apply an external electric field to a liquid crystal device assuming a chevron layer structure to induce the bookshelf structure. However, the thus-induced bookshelf structure is unstable against an external stimulation, such as temperature change.

As a liquid crystal material providing a bookshelf layer structure or a structure close thereto, there have been proposed mesomorphic compounds having a perfluoroalkyl terminal chain (U.S. Pat. No. 5,262,082) and a liquid crystal composition (Marc Raddifee, et al; 1993 Fourth Ferroelectric Liquid Crystal International Conference, P-46). These liquid crystal materials can provide a layer structure of a bookshelf or one close thereto having a small layer inclination angle and providing an optimum tilt angle without using an external field such as an electric field. Generally, however, these liquid crystal materials including a mesomorphic compound having a perfluoroether terminal chain do not assume cholesteric phase and it is difficult to finally produce a sufficiently good alignment state.

SUMMARY OF THE INVENTION

In view of the above-mentioned circumstances, an object of the present invention is to provide a liquid crystal device wherein a liquid crystal layer structure of a bookshelf structure or a structure close thereto is stably formed so as to provide an excellent alignment state, a high contrast, a quick response speed, a high resolution and a high brightness.

Another object of the present invention is to provide a liquid crystal apparatus, such as a display apparatus, including such a liquid crystal device and capable of realizing a high contrast, a high resolution, a high brightness, a large display area, and excellent display characteristics.

According to the present invention, there is provided a liquid crystal device, comprising: a first substrate and a second substrate disposed opposite to each other, and a liquid crystal lacking cholesteric phase disposed between the first and second substrates; said first substrate having a surface contacting the liquid crystal showing a surface energy $\gamma_1$ (dyne/cm) and said second substrate having a surface contacting the liquid crystal showing a surface energy $\gamma_2$ (dyne/cm) satisfying $\gamma_1 > \gamma_2$; the surface of said first substrate comprising a film of a polyimide or an aromatic polyamide, the surface of said first substrate having been selectively subjected to a uniaxial aligning treatment.

In the liquid crystal device according to the present invention, a liquid crystal material, particularly a ferroelectric liquid crystal material, lacking cholesteric phase is caused to stably assume the above-mentioned bookshelf structure or a structure close thereto between a pair of substrates by setting the surface energy conditions and aligning treatment conditions as described above to the liquid crystal-contacting surfaces.

Further, according to the present invention, it is possible to provide a ferroelectric liquid crystal device assuming an excellent alignment state and capable of providing a high contrast, an excellent high-speed responsiveness and high-resolution and high brightness display characteristics.

In the present invention, a liquid crystal device having particularly excellent performances and suitable for providing a large-area display having excellent display characteristics can be realized by using a liquid crystal composition comprising a mesomorphic compound represented by the following general formula (I):

$$P—Q—A—W—B—(T—D)_n—U—V \qquad (I),$$

wherein A, B and D independently denote an aromatic ring, a heterocyclic ring, an alicyclic ring, or a condensed ring structure thereof, each capable of having a substituent; Q, W and T independently denote a single bond, —O—, —COO—, —OCO—, —C≡C—, —CONR—, —NRCO—, —NR—, —CH$_2$—, —CH=N—, —N=CH—, —CH=CH—, —COS—, —SCO—, —CH$_2$CH$_2$—, —CH$_2$O— or —OCH$_2$—, wherein R denotes an alkyl group; P denotes an alkyl group capable of having a substituent; n denotes 0, 1 or 2; U denotes —CO—C$_m$H$_{2m}$—, —O—C$_m$H$_{2m}$—, —C$_m$H$_{2m}$CO—, —C$_m$H$_{2m}$O—, —C$_m$H$_{2m}$—, —OSO$_2$—, —SO$_2$O—, —SO$_2$—, —SO$_2$—C$_m$H$_{2m}$—, —O—C$_m$H$_{2m}$—O—C$_m$H$_{2m}$—, —C$_m$H$_{2m}$SO$_2$—, —C$_m$H$_{2m}$—O—C$_m$H$_{2m}$—O—, —C$_m$H$_{2m}$—N(C$_{m'}$H$_{2m'+1}$)—SO$_2$—, —C$_m$H$_{2m}$—N(C$_{m'}$H$_{2m'+1}$)—CO—, —SO$_2$—N(C$_{m'}$H$_{2m'+1}$)—C$_m$H$_{2m}$— or —CO—N(C$_{m'}$H$_{2m'+1}$)—C$_m$H$_{2m}$—, wherein m and m' independently denote an integer of 1 to 20; V denotes —(C$_p$F$_{2p}$O)$_q$C$_r$F$_{2r+1}$, wherein q is an integer of 1–6; p is an integer of 1–10 which can be independently set where q is plural, and r is an integer of 1–10.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A–3D are schematic illustrations of states of phase transition of Iso (isotropic) phase to SmA (smectic A) phase of a liquid crystal material lacking Ch (cholesteric) phase.

FIG. 6A is a waveform diagram showing two types of applied voltage waveform used in Examples appearing hereinafter; FIG. 6B is an illustration of resultant transmitted light intensities through the device; and FIGS. 6AA and 6AB are enlarged illustrations of the two types of applied voltage waveforms shown in FIG. 6A.

DETAILED DESCRIPTION OF THE INVENTION

Figure 1:
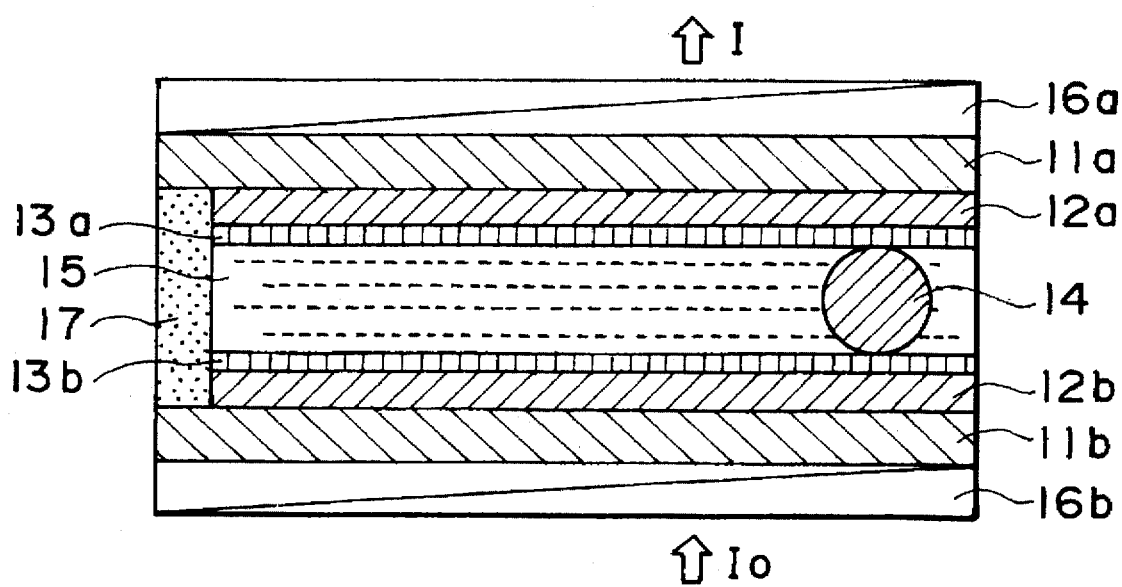
FIG. 1 is a schematic sectional view of an embodiment of the liquid crystal device using a chiral smectic liquid crystal according to the present invention.
Figures 2A, 2B, 2C, 2D:
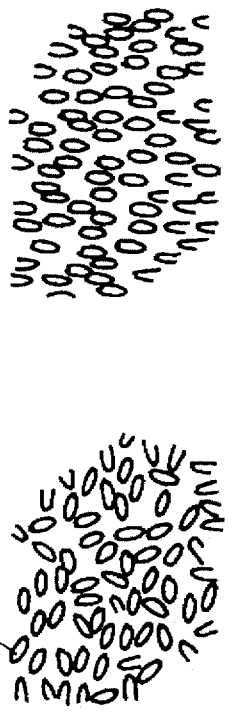
FIGS. 2A–2D are schematic illustrations of liquid crystal molecular alignment states in respective liquid crystal phases.

A ferroelectric liquid crystal disposed between a pair of oppositely disposed substrates may develop ferroelectricity and bistability in its Sm* phase (chiral smectic phase, typically SmC* (chiral smectic C) phase), which is formed by gradual cooling from its liquid phase (isotropic phase). Accordingly, the alignment state in chiral smectic phase is greatly affected by a phase transition series between the isotropic phase and the chiral smectic phase. In view of the thermodynamic stability, the phase transition series may include the following four types:

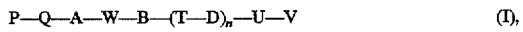   (1)

 (2)

 (3)

and

 (4)

wherein Iso denotes isotropic phase; Ch(N*), cholesteric (chiral nematic) phase; and SmA, smectic A phase. The liquid crystal alignment states in the respective phases are schematically illustrated in FIGS. 2A–2D. In the case of a liquid crystal material having the phase transition series (1), a liquid crystal molecule long axis order is determined at Iso—Ch transition, a liquid crystal molecule positional order (layer structure) is determined at Ch—SmA transition, and a liquid crystal molecule tilt is developed at SmA—SmC* transition, so that a uniform alignment can be easily obtained because of such a sequential order determination. In contrast thereto, in the cases of liquid crystal having the phase transition series (2), (3) and (4), it becomes difficult to realize a uniform alignment because plural orders have to be determined simultaneously, i.e., simultaneous determination of molecular long axis order and layer structure for (2);

simultaneous determination of layer structure and tilting of liquid crystal molecules for (3); and simultaneous determination of molecular long-axis order, layer structure and tilting for (4). The present invention aims at realization of uniform alignment of a liquid crystal material (composition) having the phase series (2).

FIGS. 3A–3D are sketches of polarizing microscopic observation by us of stages of Iso—SmA phase transition. According to our observation during the transition from isotropic (Iso) phase to smectic A (SmA) phase, islands of SmA (hereinafter called "batonnets") having an almost spheroidal shape are first generated and are joined together to complete the phase transition. Further, it is also observed that alignment defects occur when the batonnets grow in random directions or due to joint failure between batonnets.

The alignment defects due to batonnets' growth in random directions may be attributable to an insufficiency in uniaxial alignment control force at the boundaries (preferably those provided with an alignment control layer) of a pair of substrates sandwiching the liquid crystal in a final device structure. More specifically, alignment defects for the above reason are liable to occur in case where there is a large degree of unevenness at boundaries between the alignment control layer and the liquid crystal layer, and/or the alignment control layer comprises a film of a material having a poor linearity of molecular structure.

On the other hand, alignment defects due to joint failure between batonnets are liable to occur in case where the surface energies of the contacting surfaces of a pair of substrates contacting the liquid crystal are on the same order. These type of defects are considered to occur in any aligning treatment states of both substrate surface including, e.g., the case of rubbing being applied to only one substrate and the case of rubbing being applied to both substrates.

According to the present invention, in a liquid crystal device using a chiral smectic liquid crystal material lacking cholesteric phase as described above, a uniform alignment state can be realized by using a first substrate having a surface contacting the liquid crystal subjected to a uniaxial aligning treatment, such as rubbing, and showing a surface energy $\gamma_1$ (dyne/cm) and a second substrate having a surface contacting the liquid crystal showing a surface energy $\gamma_2$ (dyne/cm) satisfying $\gamma_1 > \gamma_2$.

In order to realize a uniform alignment characteristic, a larger value of $\gamma_1$ is preferred, particularly $\gamma_1 \geq 40$ dyne/cm, more preferably $\gamma_1 \geq 45$ dyne/cm.

Further, for accomplishing a uniform alignment characteristic, a large difference between $\gamma_1$ and $\gamma_2$ is preferred, particularly $\gamma_1 - \gamma_2 > 9$ dyne/cm, more preferably $\gamma_1 - \gamma_2 > 17$ dyne/cm.

As a uniaxial aligning treatment, rubbing is preferred because of simplicity and excellent productivity.

The rubbing is generally performed in one direction. However, the rubbing may also be performed in two directions including a forward direction and a direction almost opposite thereto. By such rubbing in forward and reverse directions, it becomes possible to provide a smaller apparent pretilt angle, stabilize the bookshelf structure and reduce the movement of liquid crystal molecules caused in a certain type of liquid crystal, thereby preventing a deterioration in display quality due to such liquid crystal movement.

The liquid crystal (composition) used in the liquid crystal device of the invention lacking cholesteric phase may preferably comprise at least one species of mesomorphic compounds represented by the following general formula (I):

$$P—Q—A—W—B—(T—D)_n—U—V \qquad (I),$$

wherein A, B and D independently denote an aromatic ring, a heterocyclic ring, an alicyclic ring, or a condensed ring structure thereof, each capable of having a substituent; Q, W and T independently denote a single bond, —O—, —COO—, —OCO—, —C≡C—, —CONR—, —NRCO—, —NR—, —CH$_2$—, —CH=N—, —N=CH—, —CH=CH—, —COS—, —SCO—, —CH$_2$CH$_2$—, —CH$_2$O— or —OCH$_2$—, wherein R denotes an alkyl group; P denotes an alkyl group capable of having a substituent; n denotes 0, 1 or 2; U denotes —CO—C$_m$H$_{29397\ m}$—, —O—C$_m$H$_{2m}$—, —C$_m$H$_{2m}$CO—, —C$_m$H$_{2m}$O—, —C$_m$H$_{2m}$—, —OSO$_2$—, —SO$_2$O—, —SO$_2$—, —SO$_2$—C$_m$H$_{2m}$—, —O—C$_m$H$_{2m}$—O— C$_m$H$_{2m}$—, —C$_m$H$_{2m}$SO$_2$—, —C$_m$H$_{2m}$—O—C$_m$H$_{2m}$—O—, —C$_m$H$_{2m}$—N(C$_{m'}$H$_{2m'+1}$)—SO$_2$—, —C$_m$H$_{2m}$—N(C$_{m'}$H$_{2m'+1}$)—CO—, —SO$_2$—N(C$_{m'}$H$_{2m'+1}$)—C$_m$H$_{2m}$— or —CO—N(C$_{m\ H2m'}$H$_{2m'+1}$)—C$_m$H$_{2m}$—, wherein m and m' independently denote an integer of 1 to 20; V denotes —(C$_p$F$_{2p}$O)$_q$C$_r$F$_{2r+1}$, wherein q is an integer of 1–6; p is an integer of 1–10 which can be independently set where q is plural, and r is an integer of 1–10.

Specific examples of the mesomorphic compounds lacking cholesteric phase may include those represented by the formulae shown below. These compounds may be used singly or in a mixture of two or more species.

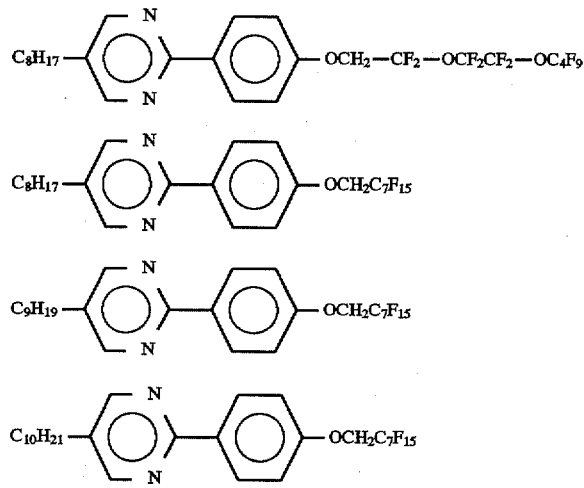

-continued

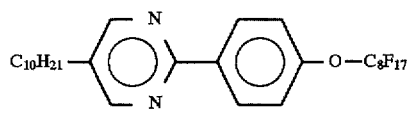

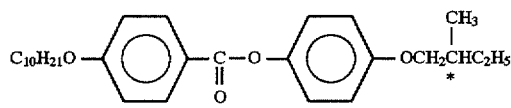

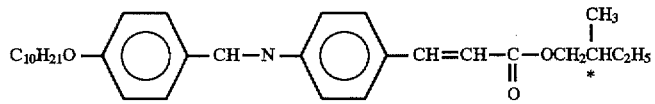

In the present invention, it is preferred that at least 60 wt. %, more preferably at least 80 wt. %, of the liquid crystal (composition) used in the device is occupied by at least one species of such mesomorphic compounds lacking cholesteric phase.

The liquid crystal (composition) thus constituted and suitably used in the present invention may preferably be one lacking cholesteric phase in all the temperature range. However, the present invention can also be suitably applied to a liquid crystal composition substantially lacking cholesteric phase, i.e., one failing to provide a temperature range where it entirely assumes cholesteric phase or one capable of partly having cholesteric phase, e.g., in mixture of cholesteric phase and isotropic phase, in a certain temperature range.

The liquid crystal used in the present invention may preferably contain a compound (a) having a solubility limit with the liquid crystal lacking cholesteric phase in an amount of at least 20 wt. % of and up to the solubility limit, whereby the batonnet occurring density in the device can be improved to accomplish better alignment state. In this instance, the compound (a) may preferably be added within a range of improving the alignment uniformity but not impairing the characteristic of the base or mother liquid crystal. However, a remarkable additional effect of improving the alignment uniformity cannot be attained below 20% of the solubility limit. The addition amount (content) of the compound (a) may be lowered by using a compound (a) having a high crystallinity (i.e., a large melting enthalpy) and/or a temperature of transition to crystal phase which is higher than the base liquid crystal. A compound (a) satisfying both of these properties may be further preferably used. Under such circumstances, the addition of the compound (a) in a range of at least 40% of and up to the solubility limit provides a practical improvement in alignment uniformity.

The compound (a) having a solubility limit with the base liquid crystal (consisting of at least one mesomorphic compound lacking cholesteric phase) may be defined as a compound providing an upper solubility limit in the resultant mixture of at most 20 wt. %, preferably at most 10 wt. %, with the base liquid crystal at a lower limit usable temperature of the base liquid crystal, e.g., at −20° C.

As described above, the compound (a) may preferably have a high crystallinity, i.e., a large melting enthalpy. More specifically, the compound (a) may preferably have a melting enthalpy ΔH of at least 52 Joule/g.

The compound (a) may preferably have a temperature of transition from isotropic phase to crystal phase or liquid crystal phase which is higher than the isotropic-smectic A phase transition temperature of the base liquid crystal (compound or mixture) lacking cholesteric phase in order to further enhance the effect of improving the alignment uniformity.

Hereinbelow, specific examples of the compound (a) are enumerated below together with the phase transition temperature (Tp) and melting enthalpy (ΔH) thereof. These are, however, of course not exhaustive.

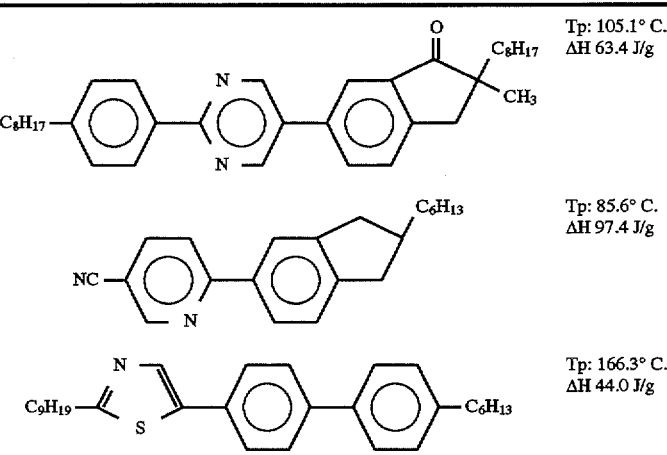

-continued

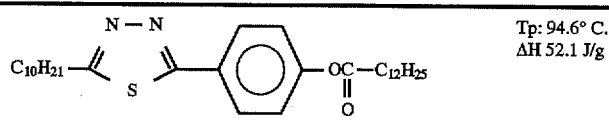
Tp: 94.6° C.
ΔH 52.1 J/g

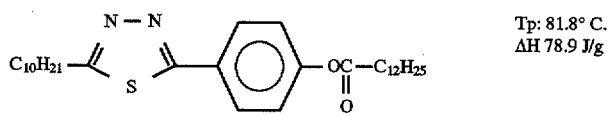
Tp: 81.8° C.
ΔH 78.9 J/g

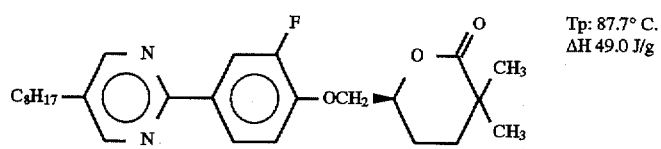
Tp: 87.7° C.
ΔH 49.0 J/g

Structurally, a typical class of the compound (a) may be referred to as a achiral compound having a core part comprising a substituted or unsubstituted aliphatic ring, aromatic ring, heterocyclic ring or condensed ring structure of these, or a combination of these with a bonding group or a single bond; and an unsubstituted alkyl group or a substituted alkyl group free from perfluoro-substitution connected to one or both ends of the core part via a bonding group or a single bond.

The liquid crystal (composition) used in the present invention may further contain another mesomorphic compound other than those described above, and additives, such as antioxidants, ultraviolet absorbers, dyes and pigments.

The first substrate used to constitute the liquid crystal device according to the present invention may generally include a base structure, such as an electrode plate, and an alignment control layer subjected to a uniaxial aligning treatment disposed thereon on a side contacting the liquid crystal.

In the present invention, the alignment control layer disposed on the first substrate may comprise a film of a polyimide or an aromatic polyamide are have a surface energy $\gamma_1$ (dyne/cm) which satisfies $\gamma_1 > \gamma_2$ with the surface energy $\gamma_2$ of the opposite second substrate. It is preferred to use an alignment control layer comprising a film of a polyimide represented by the following general formula (II) because of good uniaxial alignment characteristic:

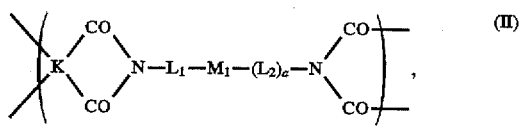 (II)

wherein K denotes

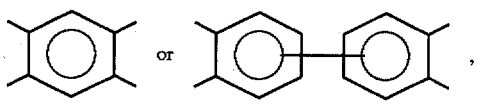

$L_1$ and $L_2$ respectively denote

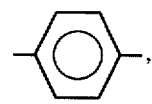

$M_1$ denotes a single bond or —O—; and a denotes 0, 1 or 2.

On the other hand, an aromatic polyamide film is preferable because of a relatively low baking temperature.

Another advantage of the polyimide and aromatic polyamide is the applicability of a conventional solvent, such as NMP (N-methylpyrrolidone).

Hereinbelow, some specific examples of polyimides and aromatic polyamides used to constitute uniaxial alignment control layers are enumerated by their recurring units:

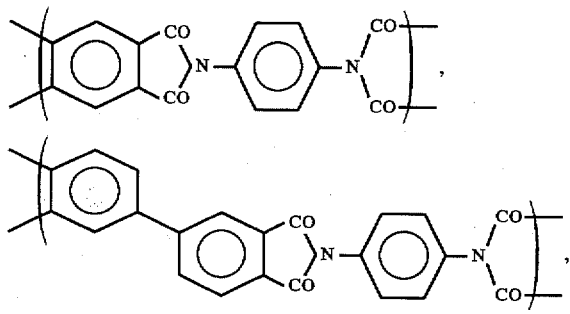

-continued

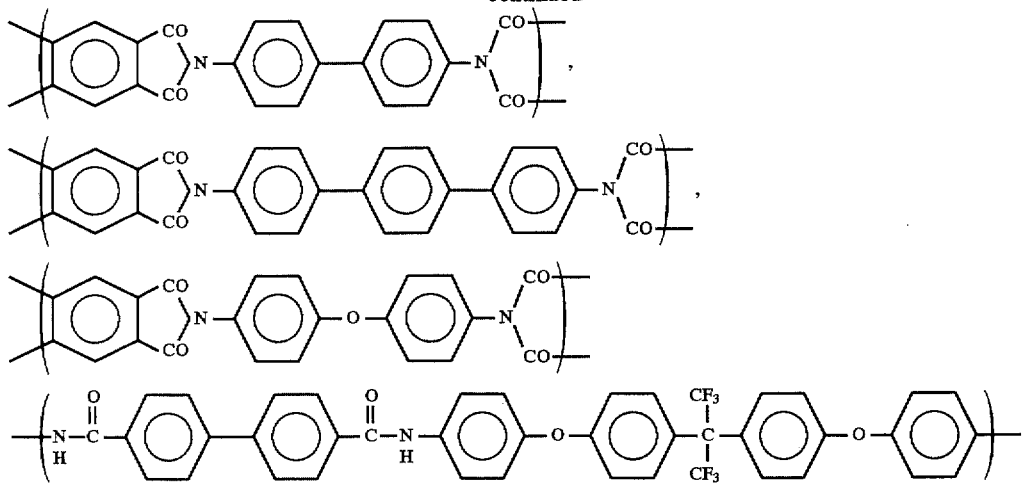

On the other hand, the second substrate constituting the liquid crystal device of the present invention is not subjected to a uniaxial aligning treatment and may generally comprise a base structure, such as an electrode plate, coated with and alignment control film of, e.g., a polyimide, not subjected to a uniaxial aligning treatment, a silane coupling agent or a fluorine-containing resin. The surface treatment applied to the second substrate is not particularly limited as far as the surface energy relationship of $\gamma_1 > \gamma_2$ is satisfied.

Some examples of coating materials for providing the alignment control layer not subjected to a uniaxial aligning treatment are enumerated below:

ODS—E (Trade name, available from Chisso K.K.)

$CH_3(CH_2)_{17}Si(OC_2H_5)_3$

TSL8233
(Trade name, available from Toshiba Silicone K.K.)

$CF_3(CF_2)_7CH_2CH_2Si(OMe)_3$

TSL8257
(Trade name, available from Toshiba Silicone K.K.)

$CF_3(CF_2)_5CH_2CH_2Si(OMe)_3$

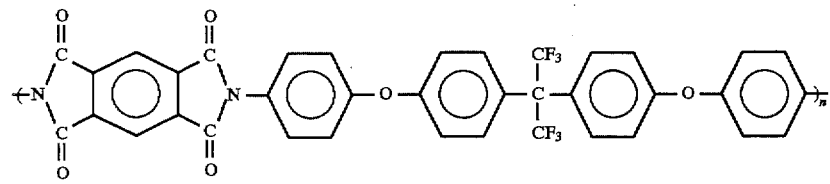

-continued

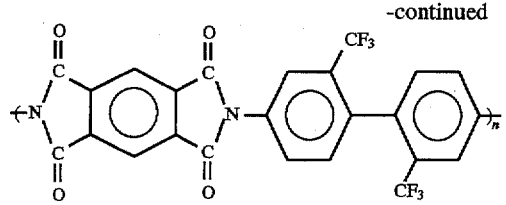

(n: polymerization degree)

In order to suppress the occurrence of alignment defects to a practically negligible level, the surface energies $\gamma_1$ and $\gamma_2$ of the first and second substrates may preferably satisfy $\gamma_1-\gamma_2>9$ (dyne/cm), more preferably $\gamma_1-\gamma_2>17$ (dyne/cm), through appropriate designing of (the alignment control layers of) the substrates.

The liquid crystal materials represented by the above-mentioned general formula (I) may have a low surface energy of, e.g., 15–25 (dyne/cm) as measured by a method described hereinafter. This may be attributable to the fact that they contain fluorine atoms in their molecular structure. In contrast thereto, generally known fluorine-free liquid crystal materials may have a surface energy on the order of 30–40 (dyne/cm).

On the other hand, as for a surface energy $\gamma_{ALG}$ of an alignment control film and a surface energy $\gamma_{LC}$ of a liquid crystal, it is generally assumed that a homogeneous alignment develops where $\gamma_{ALG}>\gamma_{LC}$ and a homeotropic alignment develops where $\gamma_{ALG}<\gamma_{LC}$. Accordingly, in order to stably obtain a homogeneous alignment state suited for an ordinary ferroelectric liquid crystal, it is preferred to provide an alignment film surface energy $\gamma_{ALG}$ which is larger than the liquid crystal surface energy $\gamma_{LC}$.

Further, in order to further stabilize the homogeneous alignment state, it is further preferred to satisfy $\gamma_{ALG}-\gamma_{LC}>$ca. 10 (dyne/cm), particularly $\gamma_1-\gamma_{LC}>$ca. 10 (dyne/cm).

The surface energy values referred to herein are based on values measured according to the following method.

Surface Energy of Alignment Film

A contact angle measuring apparatus ("Model CA-DT", available from Kyowa Kaimen Kagaku K.K.) was used.

A glass substrate coated with a sample alignment film was provided, and α-bromonaphthalene, methylene iodide and pure water were separately dripped to measure contact angles $\theta_1$, $\theta_2$ and $\theta_3$, respectively, with the alignment film. By substituting the measured values $\theta_1$, $\theta_2$ and $\theta_3$ into formulae shown below to calculate a dispersion term $\gamma_s^d$ a polarization term $\gamma_s^p$ and a hydrogen bond term $\gamma_s^h$ from which the surface energy $\gamma_1$ and $\gamma_2$ is calculated as $\gamma_s^d+\gamma_s^p+\gamma_s^h$:

$$\sqrt{\gamma_s^d} = \frac{1}{2}\sqrt{44.6}\,(1+\cos\theta_1),$$

$$\sqrt{\gamma_s^p} = \frac{(46.8+4.0)(1+\cos\theta_2)-2\sqrt{46.8}\sqrt{\gamma_s^d}}{24.0},$$

$$\sqrt{\gamma_s^h} = \frac{(29.1+1.3+42.4)(1+\cos\theta_3)-2\sqrt{29.1}\sqrt{\gamma_s^d}-2\sqrt{1.3}\sqrt{\gamma_s^p}}{2\sqrt{42.4}}$$

wherein the respective factors represent the following terms:

44.6: surface energy of α-bromonaphthalene, 46.8 and 4.0: dispersion term, and polarization term, respectively of methylene iodide, 29.1, 1.3 and 42.4: dispersion term, polarization term and hydrogen bond term, respectively, of pure water.

Surface Energy of Liquid Crystal

The platinum ring method was used. That is, a sample liquid crystal was dripped on a heating plate and transformed into the isotropic phase. The liquid crystal in this state was pulled up by a platinum ring to measure a pulling force at which the liquid crystal was broken. The measured data was calibrated by the data of pure water measured by the same apparatus to obtain a surface energy $\gamma_{LC}$ of the liquid crystal.

Hereinbelow, the cell structure of a preferred embodiment of the liquid crystal device according to the present invention will be described with reference to FIG. 1.

Referring to FIG. 1, the liquid crystal device includes a pair of glass substrates 11a and 11b having thereon transparent electrodes 12a and 12b, respectively, of tin oxide, indium oxide, indium tin oxide (ITO), etc. The substrate 11a is further provided with an alignment film (alignment control layer) of a polyimide or aromatic polyamide subjected to a uniaxial aligning treatment, such as rubbing. The substrate 11b is provided with an alignment film 13b of silane coupling agent, polyimide, polysiloxane, etc., not subjected to a uniaxial aligning treatment. The substrates 11a and 11b are disposed opposite to each other with spacer beads 14 of, e.g., silica or alumina and sealed at periphery thereof with a sealant 17 to leave a space therebetween, which is filled with a ferroelectric liquid crystal mixture. The thus-formed cell structure is sandwiched between a pair of polarizers 16a and 16b to form a liquid crystal device for optically modulating incident light $I_0$ into transmitted modulated light I. While not shown in FIG. 1, it is possible to insert an insulating film of ZnO, ZrO, TaO$_x$, etc., between the transparent electrode 12a (or/and 12b) and the alignment film 13a (or/and 13b) for the purpose of preventing short circuit between the pair of substrates 11a and 11b. In this embodiment, the surface energies $\gamma_1$ and $\gamma_2$ of the alignment control layers 13a and 13b, respectively, are set to satisfy $\gamma_1>\gamma_2$, and the liquid crystal 15 comprises a chiral smectic liquid crystal (mixture) lacking cholesteric phase and further preferably a compound (a) as descried above in a proportion of at least 20% of and below the solubility limit thereof.

In the liquid crystal device of the above-descried structure, the transparent electrodes 12a and 12b may be connected to a signal power supply (not shown) via lead wires so as to effect switching depending on switching signals from the signal power supply. The liquid crystal device may function as a light valve of a display device, etc. Further, if transparent electrodes 12a and 12b are provided respectively in pluralities so as to form a cross matrix electrode structure, a pattern display or exposure becomes possible to provide displays for a personal computer, a wordprocessor, etc., or a light valve for a printer, etc.

In the liquid crystal device of the above-mentioned structure, the alignment control layer 13a may preferably comprise a uniaxially aligning-treated film of a polyimide which has been formed by application of a polyamic acid and baking thereof, because of easy preparation and high alignment control power. A rubbing-treated polyimide film is particularly preferred. The polyimide may preferably have a molecular structure rich in rigidity, linearity and crystallinity. More specifically, it is preferred to use a polyimide having a recurring unit represented by the above-mentioned formula (II). The alignment control layer 13a may also preferably comprise a film of an aromatic polyamide subjected to a uniaxial aligning treatment.

Incidentally, the liquid crystal device of the present invention may have a structure not particularly limited as far as it uses a specific liquid crystal lacking cholesteric phase and a substrate structure satisfying a specific surface energy relationship suitable for controlling the liquid crystal layer to provide desired functions.

In the case where the liquid crystal device according to the present invention is used to constitute a display device, the liquid crystal (composition) as a display medium assumes a chiral smectic layer structure of a bookshelf or one close thereto having a small layer inclination angle which is in a good alignment state, shows a good respectiveness and can provide a large area of good display image having high resolution, high brightness and excellent contrast.

Hereinbelow, the present invention will be described based on Examples and Comparative Examples, in which the following compositions a and b were used.

TABLE 1

| | | Composition | |
|---|---|---|---|
| | Compounds (incorporated) | a | b |
| A | $C_8H_{17}$—⟨N=N⟩—⟨ ⟩—$OCH_2CF_2OCF_2CF_2OC_4F_9$ | 90 | 90 |
| B | $C_{10}H_{21}$—⟨N=N⟩—⟨ ⟩—$OCH_2C_7H_{15}$ | 5 | 5 |
| C | $C_6H_{13}O$—⟨ ⟩—⟨ ⟩—$COO$—*CH($CF_3$)—CH$_2$—*CH($OC_6H_{13}$) | 5 | 4 |
| D | $C_8H_{17}$—⟨N=N⟩—⟨ ⟩—$OCH_2$—O—CO—C(CH$_3$)$_2$—... | 0 | 1 | as a compound (a)

(wt. parts)

The liquid crystal device according to the present invention can constitute various liquid crystal apparatus inclusive of display apparatus and optical shutter. For example, a liquid crystal apparatus 101 having a control system as illustrated by its block diagram shown in FIG. 4 may be constituted by using a liquid crystal device according to the present invention as a display panel 103. FIG. 5 is a time chart illustrating a manner of data communication for transferring image data including scanning line address data and certain data format as illustrated by using a communication synchronizing means based on a SYNC signal.

Figure 4:
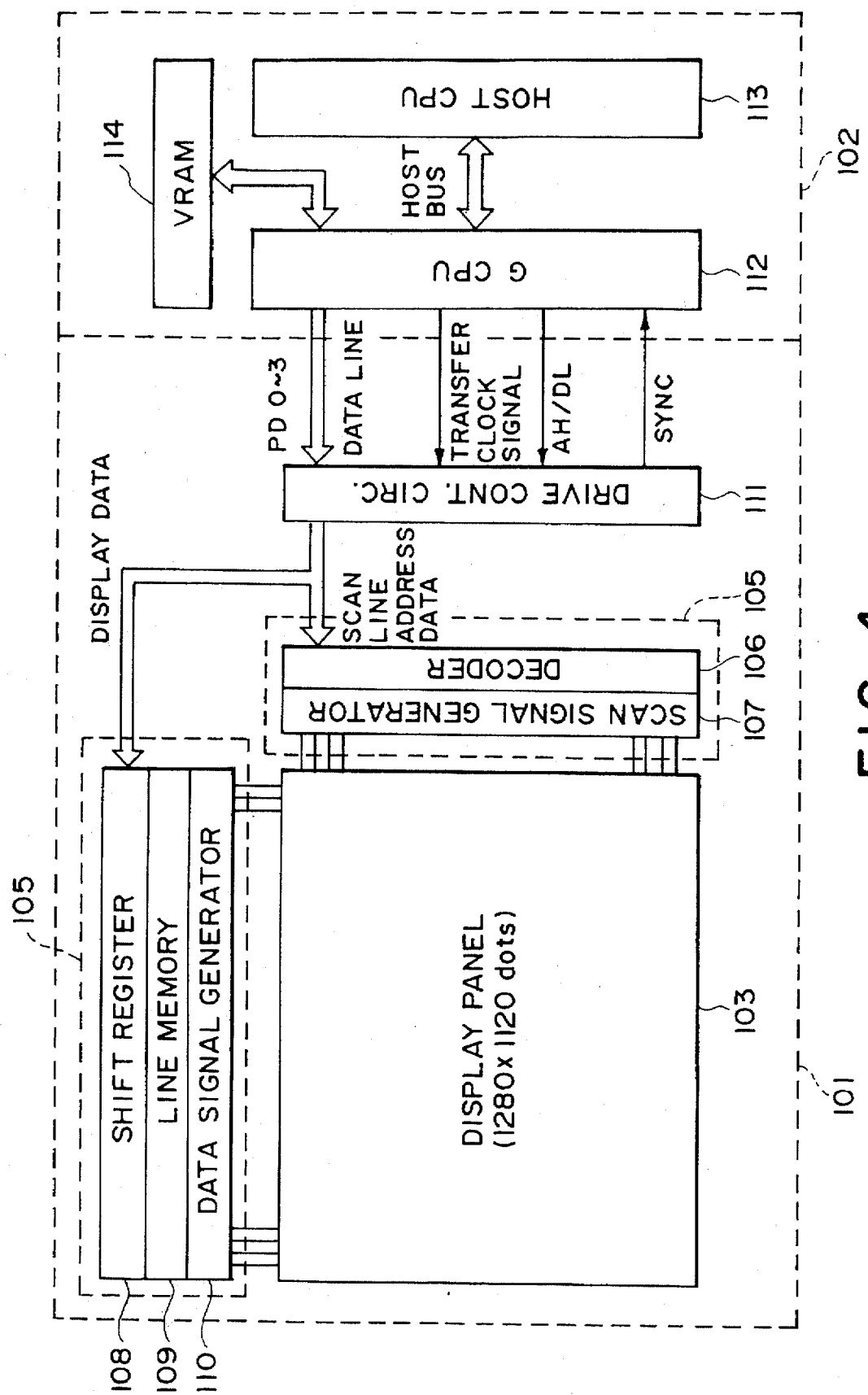
FIG. 4 is a block diagram of a liquid crystal apparatus (display apparatus) including a liquid crystal deice using a chiral smectic liquid crystal and a graphic controller.
Figure 5:
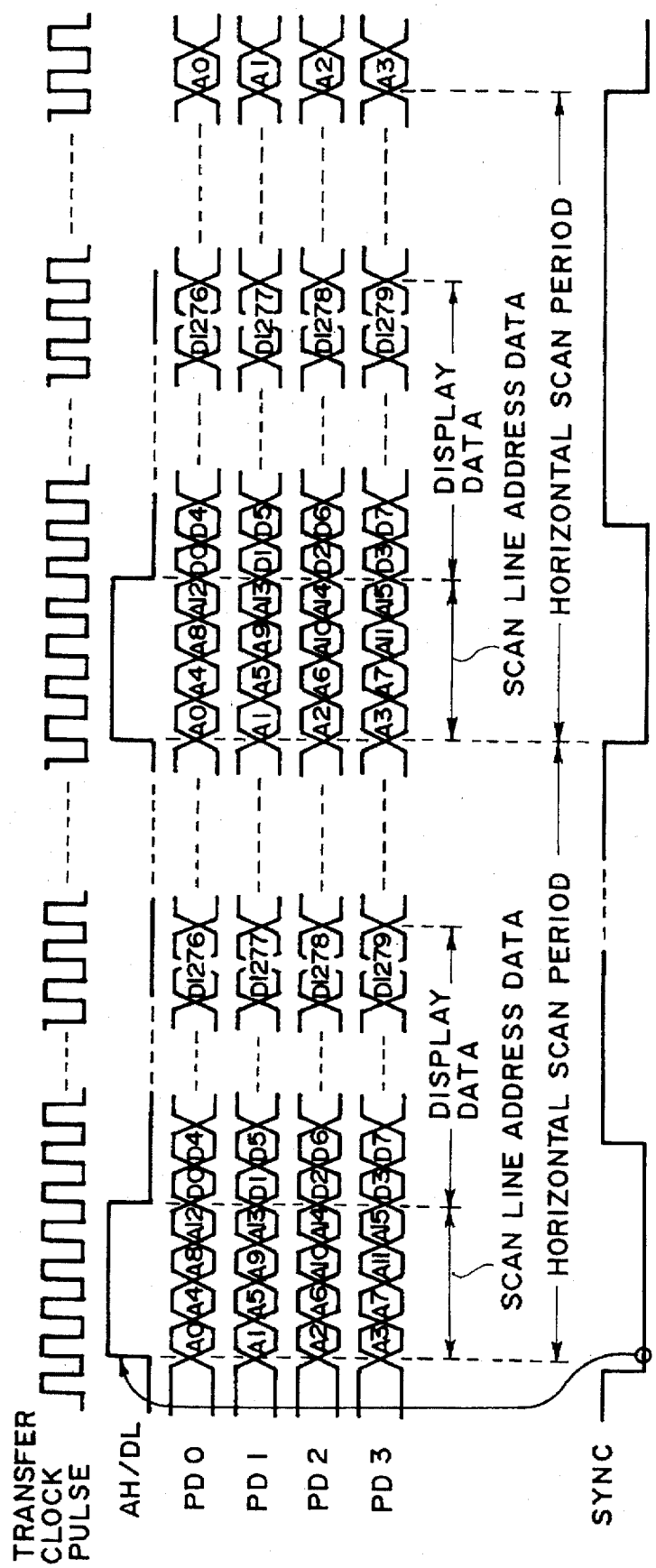
FIG. 5 is a time chart illustrating a member of image data communication between the display data and the graphic controller.

More specifically, image data is generated from a graphic controller 102 in an apparatus main body and is transferred to the display panel signal transfer means as illustrated in FIGS. 4 and 5. The graphic controller 102 includes graphic central processing unit (GCPU) 112 and image data storage memory (VRAM) as core units and is in charge of control and communication of image data between a host CPU therein and the liquid crystal display apparatus 101. Incidentally, a light source (backlight) may be disposed, as desired, behind the display panel.

The compositions a and b were respectively formed to be a chiral smectic liquid crystal lacking cholesteric phase.

EXAMPLE 1

Two 1.1 mm-thick glass substrates each provided with a ca. 150 nm-thick ITO film were provided.

One substrate (first substrate) was provided with a polyimide alignment control film by spin coating, i.e., by dripping a 0.7 wt. %-solution of polyamic acid ("LP-64" (trade name), available from Toray K.K.) in a mixture solvent of NMP (N-methylpyrrolidone/nBC (n-butylcellosolve) (=2/1) onto the glass substrate rotating at 2700 rpm, followed by continuation of the rotation for 20 sec. Thereafter, the coating was pre-dried at 80° C. for 5 min and hot-baked at 270° C. for 1 hour to form a 5 nm-thick polyimide film, which was then subjected to a uniaxial aligning treatment, i.e., rubbing with a nylon cloth. The alignment film thus subjected to a uniaxial aligning treatment showed a surface energy of 50 dyne/cm.

Then, the other substrate (second substrate) was coated with a film of silane coupling agent by spin coating. More specifically, a 0.5 wt. % solution in ethanol of a silane coupling agent ("ODS-E" (trade name), available from Chisso K.K.) was dripped onto the glass substrate rotating at 2000 rpm, followed by continuation of the rotation for 20 sec. The coating was pre-dried at 80° C. for 5 min and then hot-baked at 180° C. for 1 hour, to provide a treated surface showing a surface energy of 30 dyne/cm.

Then, onto the first substrate subjected to the uniaxial aligning treatment, silica beads of ca. 2.0 μm in average diameter were dispersed, and the other glass substrate was superposed thereon, followed by sealing at the periphery thereof with a sealing agent, to form a blank cell.

Two blank cells thus-prepared were filled under vacuum with the above-prepared liquid crystal (compositions) a and b, respectively, heated to isotropic phase, followed by gradual cooling at a rate of 4° C./min, to form liquid crystal cells. The alignment states of liquid crystal molecules in the thus-prepared two liquid crystal devices (liquid crystal cells) were observed through a polarizing microscope, whereby no alignment defects were observed in either liquid crystal cell. Then, the contrasts were measured to provide results shown in Table 2 hereinbelow.

From the results, it is understood that the liquid crystals lacking cholesteric phase sealed in devices having two substrate surfaces with a difference in surface energy, e.g., with a higher surface energy on the uniaxially aligning-treated surface, could be uniformly aligned to accomplish a high contrast.

Now, the method of contrast measurement used herein will be described.

First, a sample liquid crystal device was sandwiched between a pair of polarizers disposed in right-angle cross nicols and supplied with driving waveforms as shown in FIG. 6A (enlarged in FIGS. 6AA and 6AB) (20 V/μm, ⅓ bias, duty factor of 1/1000). Pulse widths were adjusted to cause bistable switching. At a first switched state, the liquid crystal device was rotated so as to find the darkest position where the transmitted light intensity Ib (as shown in FIG. 6B) was measured by a photomultiplier. Then, after switching into a second state, the light intensity Iw at the brightest state (as shown in FIG. 6B) was measured. From the results, a contrast ratio (CR) as an evaluation factor was obtained as a ratio Iw/Ib. The value CR is a measure of an alignment uniformity and is decreased also in the case of alignment defects causing light leakage therethrough to provide a larger Ib value.

EXAMPLE 2

Blank cells were prepared in the same manner as in Example 1 except for the use of a silane coupling agent ("TSL8233" (trade name) available from Toshiba Silicone K.K.) on the second substrate, and filled with the liquid crystal compositions a and b respectively, to obtain liquid crystal cells.

The liquid crystal cells showed good alignment uniformity and high contrasts as shown in Table 2. The substrate coated with "TSL8233" showed a surface energy of 23 dyne/cm.

EXAMPLE 3

Blank cells were prepared in the same manner as in Example 1 except that the second substrates were coated with a 50 nm-thick polyimide film obtained by using a polyimide precursor ("LQ1802" (trade name), available from Hitachi Kasei Kogyo K.K.) but subjected to no uniaxial aligning treatment, such as rubbing.

The liquid crystal cells showed good alignment uniformity and high contrasts as shown in Table 2. The substrate coated with "LQ1802" showed a surface energy of 33 dyne/cm.

EXAMPLE 4

The first substrate provided with a rubbed polyimide film (obtained from "LP64") was prepared in the same manner as in Example 1.

The second substrate was provided with a non-rubbed polyimide film by spin coating, i.e., by dripping a 0.7 wt. %-solution of polyamic acid ("LP-64" (trade name), available from Toray K.K.) in a mixture solvent of NMP (N-methylpyrrolidone/nBC (n-butylcellosolve) (=2/1) onto the glass substrate rotating at 2700 rpm, followed by continuation of the rotation for 20 sec. Thereafter, the coating was predried at 80° C. for 5 min and hot-baked at 270° C. for 1 hour to form a 5 nm-thick polyimide film, which was not subjected to rubbing with a nylon cloth. The alignment film thus-provided showed a surface energy of 48 dyne/cm.

Then, onto the first substrate subjected to the uniaxial aligning treatment, silica beads of ca. 2.01μm in average diameter were dispersed, and the other glass substrate was superimposed thereon, followed by sealing at the periphery thereof with a sealing agent, to form a blank cell.

The blank cell thus-prepared was filled under vacuum with the above-prepared liquid crystal (composition) a, heated to isotropic phase, followed by gradual cooling at a rate of 4° C./min, to form a liquid crystal cell. The alignment state of liquid crystal molecules in the thus-prepared liquid crystal device was observed through a polarizing microscope, whereby some alignment defects were observed at connections between batonnets. The device showed a contrast of 30.

As is understood from the results, the liquid crystal lacking cholesteric phase disposed between the pair of substrates having a small difference between surface energy thereof resulted in a smaller contrast due to light leakage through alignment defects at connections between batonnets.

EXAMPLE 5

A blank cell was prepared in the same manner as in Example 1 except that the second substrate was coated with an alignment film of a silane coupling agent MAP (represented by a structural formula of $CH_3NH(CH_2)_3Si(OCH_3)_3$) without a uniaxial aligning treatment, such as rubbing. The cell was filled with the liquid crystal composition a.

The liquid crystal cell showed a low contrast of 20 because of substantial alignment defects. The second substrate coated with MAP showed a surface energy of 55 dyne/cm.

EXAMPLE 6

A blank cell was prepared in the same manner as in Example 1 except that the second substrate was coated with a uniaxially-rubbed ca. 5 nm-thick alignment film of a polyimide (formed from a polyimide precursor ("LQ1802" (trade name) available from Hitachi Kasei K.K.) and combined with the first substrate having the uniaxially rubbed polyimide film (formed from "LP64") so that their rubbing directions were almost parallel to each other. The cell was filled with the liquid crystal composition a.

The liquid crystal cell showed alignment defects and a low contrast of 45. The second substrate coated with the rubbed polyimide film of "LQ1802" showed a surface energy of 41 dyne/cm.

EXAMPLE 7

Two 1.1 mm-thick glass substrates each provided with a ca. 150 nm-thick ITO film were provided.

One substrate (first substrate) was provided with an aromatic polyamide alignment control film by spin coating, i.e., by dripping a 0.7 wt. %-solution of an aromatic polyamide represented by a recurring unit of the following formula in a mixture solvent of NMP (N-methylpyrrolidone/nBC (n-butylcellosolve) (=1/1) onto the glass substrate rotating at 3000 rpm, followed by continuation of the rotation for 20 sec. Thereafter, the coating was pre-dried at 80° C. for 5 min and hot-baked at 270° C. for 1 hour to form a 5 nm-thick aromatic polyamide film, which was then subjected to a uniaxial aligning treatment, i.e., rubbing with a nylon cloth. The alignment film thus subjected to a uniaxial aligning treatment showed a surface energy of 46 dyne/cm.

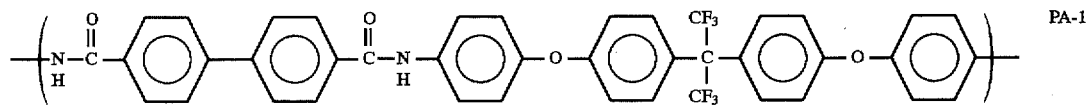

Then, the other substrate (second substrate) was coated with a film of silane coupling agent by spin coating. More specifically, a 0.5 wt. % solution in ethanol of a silane coupling agent ("ODS-E" (trade name), available from Chisso K.K.) was dripped onto the glass substrate rotating at 2000 rpm, followed by continuation of the rotation for 20 sec. The coating was pre-dried at 80° C. for 5 min and then hot-baked at 180° C. for 1 hour, to provide a treated surface showing a surface energy of 30 dyne/cm.

Then, onto the first substrate subjected to the uniaxial aligning treatment, silica beads of ca. 2.0 μm in average diameter were dispersed, and the other glass substrate was superposed thereon, followed by sealing at the periphery thereof with a sealing agent, to form a blank cell.

Two blank cells thus-prepared were filled under vacuum with the above-prepared liquid crystal (compositions) a and b, respectively, heated to isotropic phase, followed by gradual cooling at a rate of 4° C./min, to form liquid crystal cells. The alignment states of liquid crystal molecules in the thus-prepared two liquid crystal devices (liquid crystal cells) were observed through a polarizing microscope, whereby no alignment defects are observed in either liquid crystal cell. Then, the contrasts were measured to provide results shown in Table 2 hereinbelow.

From the results, it is understood that the liquid crystals lacking cholesteric phase sealed in devices having two substrate surfaces with a difference in surface energy, e.g., with a higher surface energy on the uniaxially aligning-treated surface, could be uniformly aligned to accomplish a high contrast similarly as in Example 1.

An aromatic like "PA-1" used above is advantageous since it can use a conventional solvent such as NMP unlike nylon 6/6.

EXAMPLE 8

Two blank cells were prepared in the same manner as in Example 1 except that the first substrate was coated with a rubbed film of of a polyimide (PI-1) represented by a recurring unit of the following formula, and the cells were filled with the liquid crystal compositions a and b, respectively to form liquid crystal cells.

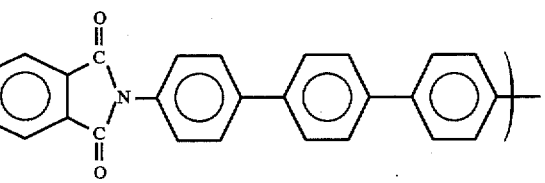

The liquid crystal cells thus prepared showed good alignment uniformity and high contrasts as shown in Table 2. The substrate coated with the rubbed polyimide showed a surface energy of 48 dyne/cm.

EXAMPLE 9

Two blank cells were prepared in the same manner as in Example 1 except that the first substrate was coated with a rubbed film of of a polyimide (PI-2) represented by a recurring unit of the following formula, and the cells were filled with the liquid crystal compositions a and b, respectively, to form liquid crystal cells.

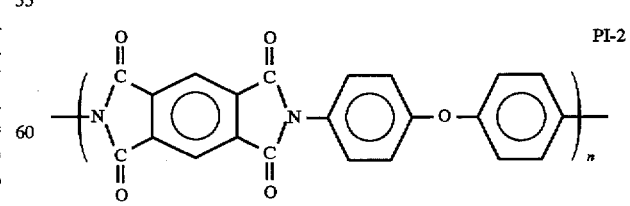

The liquid crystal cells thus prepared showed good alignment uniformity and high contrasts as shown in Table 2. The substrate coated with the rubbed polyimide showed a surface energy of 49 dyne/cm.

EXAMPLE 10

Two liquid crystal cells were prepared in the same manner as in Example 1 except that the alignment film ("LP64") of the first substrate was rubbed in the forward and reverse directions.

The liquid crystal cells showed a good alignment uniformity and high contrasts as shown in Table 2. The first substrate rubbed in two directions showed a surface energy of 5 dyne/cm.

The results of the above Examples 1–10 are summarized in the following Table 2. Among the Examples 1–4 and 6–10 apparently satisfy the requirements of the present invention.

The cell of Example 5 failed to satisfy the condition of $\gamma_1 > \gamma_2$ and showed a low contrast.

The cells of Examples 4 and 6 apparently satisfying the conditions of the present invention showed a better contrast than the cell of Example 5 but lower contrasts than the cells of the other Examples showing larger values of $\gamma_1 - \gamma_2$.

TABLE 2

| Ex. No. | Alignment film (surface energy) (dyne/cm) 1st substrate | 2nd substrate | Contrast with L.C. a | Contrast with L.C. b |
| --- | --- | --- | --- | --- |
| Ex. 1 | LP64, rubbed (50) | ODSE (30) | 85 | 105 |
| Ex. 2 | LP64, rubbed (50) | TSL8233 (23) | 90 | 110 |
| Ex. 3 | LP64, rubbed (50) | LQ1802 (33) | 88 | 105 |
| Ex. 4 | LP64, rubbed (50) | LP64 (48) | 30 | — |
| Ex. 5 | LP64, rubbed (50) | MAP (55) | 20 | — |
| Ex. 6 | LP64, rubbed (50) | LQ1802, rubbed (41) | 45 | — |
| Ex. 7 | PA-1, rubbed (46) | ODSE (30) | 80 | 103 |
| Ex. 8 | PI-1, rubbed (48) | ODSE (30) | 100 | 100 |
| Ex. 9 | PI-2, rubbed (49) | ODSE (30) | 85 | 105 |
| Ex. 10 | LP64, rubbed* (51) | ODSE (30) | 88 | 105 |

*Rubbed in the forward and reverse directions.

What is claimed is:

1. A liquid crystal device, comprising:
a first substrate and a second substrate disposed opposite to each other, and a liquid crystal lacking cholesteric phase disposed between the first and second substrates; said first substrate having a surface contacting the liquid crystal showing a surface energy $\gamma_1$ (dyne/cm) and said second substrate having a surface contacting the liquid crystal showing a surface energy $\gamma_2$ (dyne/cm) satisfying $\gamma_1 > \gamma_2$;
said first substrate comprising a surface film of a polyimide or an aromatic polyamide, the surface of said first substrate having been selectively subjected to a uniaxial aligning treatment.

2. A liquid crystal device according to claim 1, wherein $\gamma_1 \geq 40$ (dyne/cm).

3. A liquid crystal device according to claim 1, wherein $\gamma_1 \geq 45$ (dyne/cm).

4. A liquid crystal device according to claim 1, wherein said uniaxial aligning treatment comprises rubbing.

5. A liquid crystal device according to claim 4, wherein said rubbing has been effected in both a forward direction and a direction substantially reverse to the forward direction.

6. A liquid crystal device according to claim 1, wherein $\gamma_1 - \gamma_2 > 9$ (dyne/cm).

7. A liquid crystal device according to claim 1, wherein $\gamma_1 - \gamma_2 > 17$ (dyne/cm).

8. A liquid crystal device according to claim 1, wherein said liquid crystal comprises at least one mesomorphic compound lacking cholesteric phase and a compound (a) having a solubility limit with said at least one mesomorphic compound added in a proportion of at least 20% of and below the solubility limit.

9. A liquid crystal device according to claim 1, wherein said liquid crystal lacking cholesteric phase comprises at least one species of compounds represented by the following formula (I):

$$P-Q-A-W-B-(T-D)_n-U-V \qquad (I),$$

wherein A, B and D independently denote an aromatic ring, a heterocyclic ring, an alicyclic ring, or a condensed ring structure thereof, each capable of having a substituent; Q, W and T independently denote a single bond, —O—, —COO—, —OCO—, —C≡C—, —CONR—, —NRCO—, —NR—, —CH$_2$—, —CH=N—, —N=CH—, —CH=CH—, —COS—, —SCO—, —CH$_2$CH$_2$—, —CH$_2$O— or —OCH$_2$—, wherein R denotes an alkyl group; P denotes an alkyl group capable of having a substituent; n denotes 0, 1 or 2; U denotes —CO—C$_m$H$_{2m}$—, —O—C$_m$H$_{2m}$—, —C$_m$H$_{2m}$CO—, —C$_m$H$_{2m}$O—, —C$_m$H$_{2m}$—, —OSO$_2$—, —SO$_2$O—, —SO$_2$—, —SO$_2$—C$_m$H$_{2m}$—, —O—C$_m$H$_{2m}$—O—C$_m$H$_{2m}$—, —C$_m$H$_{2m}$SO$_2$—, —C$_m$H$_{2m}$—O—C$_m$H$_{2m}$—O—, —C$_m$H$_{2m}$—N(C$_{m'}$H$_{2m'+1}$)—SO$_2$—, —C$_m$H$_{2m}$—N(C$_{m'}$H$_{2m'+1}$)—CO—, —SO$_2$—N(C$_{m'}$H$_{2m'+1}$)—C$_m$H$_{2m}$— or —CO—N(C$_{m'}$H$_{2m'+1}$)—C$_m$H$_{2m}$—, wherein m and m' independently denote an integer of 1 to 20; V denotes —(C$_p$F$_{2p}$O)$_q$C$_r$F$_{2r+1}$, wherein q is an integer of 1–6; p is an integer of 1–10 which can be independently set where q is plural, and r is an integer of 1–10.

10. A liquid crystal device according to claim 9, wherein said liquid crystal further includes a compound (a) having a solubility limit with said at least one species of compounds represented by the formula (I) in a proportion of at least 20% of and below the solubility limit.

11. A liquid crystal device according to claim 8, wherein said compound (a) is an achiral compound having a core part comprising a substituted or unsubstituted aliphatic ring, aromatic ring, a heterocyclic ring or condensed ring structure of these or a combination of these with a bonding group or a single bond; and an unsubstituted alkyl group or a substituted alkyl group free from perfluoro-substitution connected to one or both ends of the core part via a bonding group or a single bond.

12. A liquid crystal device according to claim 8, wherein said compound (a) has a melting enthalpy of at least 25 J/g.

13. A liquid crystal device according to claim 8, wherein said compound (a) has an isotropic-liquid crystal phase transition temperature or isotropic-crystal phase transition temperature which is higher than an isotropic-smectic A phase transition temperature of said at least one mesomorphic compound lacking cholesteric phase.

14. A liquid crystal device according to claim 8, wherein said compound (a) is added in a proportion of at least 40% of and below the solubility limit.

15. A liquid crystal device according to claim 1, wherein said liquid crystal is a chiral smectic liquid crystal.

16. A liquid crystal device according to claim 1, wherein said liquid crystal is a ferroelectric liquid crystal.

17. A liquid crystal device according to claim 1, wherein the surface of said first substrate comprises a film of a polyimide represented by the following general formula (II):

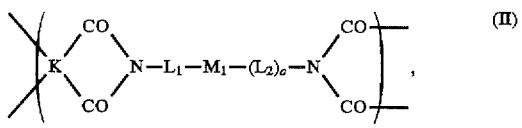

wherein K denotes

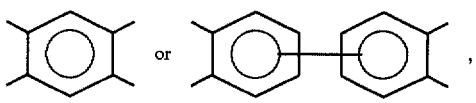

$L_1$ and $L_2$ respectively denote

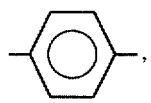

$M_1$ denotes a single bond or —O—; and a denotes 0, 1 or 2.

18. A liquid crystal apparatus, comprising a liquid crystal device according to claim 1, and means for driving the liquid crystal device.

19. A liquid crystal device according to claim 1, wherein said liquid crystal is aligned to form a bookshelf structure.

20. A liquid crystal device according to claim 1, wherein said surface film on said first substrate is a polyimide formed from a diamine and a tetracarboxylic acid having an aromatic ring.

21. A liquid crystal device according to claim 9, wherein said liquid crystal is aligned to form a bookshelf structure.

22. A liquid crystal device according to claim 9, wherein said surface film on said first substrate is a polyimide formed from a diamine and a tetracarboxylic acid having an aromatic ring.

23. A process for producing a liquid crystal device of the type comprising a first substrate and a second substrate disposed opposite to each other, and a liquid crystal lacking cholesteric phase disposed between the first and second substrates; said process including the steps of:

forming a film of a polyimide or an aromatic polyamide on a surface contacting the liquid crystal of at least said first substrate; and subjecting said film to a uniaxial aligning treatment such that said first surface of said first substrate contacting said liquid crystal has a surface energy $\gamma_1$ (dyne/cm), wherein said second substrate has a surface contacting the liquid crystal has a surface energy $\gamma_2$ (dyne/cm) satisfying $\gamma_1 > \gamma_2$.

24. A process according to claim 23, wherein said uniaxial aligning treatment comprises rubbing.

25. A process according to claim 23, wherein the liquid crystal contacting the surfaces of the first and second substrates is aligned to form a bookshelf structure.

* * * * *

UNITED STATES PATENT AND TRADEMARK OFFICE
CERTIFICATE OF CORRECTION

PATENT NO. : 5,686,019

DATED : November 11, 1997

INVENTOR(S): KATSUTOSHI NAKAMURA

It is certified that error appears in the above-identified patent and that said Letters Patent is hereby corrected as shown below:

COLUMN 1

Line 12, "receives" should read --receivers--.

COLUMN 2

Line 17, "(1990). These problems has" should read --(1990)). These problems have--.

COLUMN 4

Line 18, "deice" should read --device--.

COLUMN 5

Line 8, "us" should read --use--;
Line 19, "those-provided" should read --those provided--;
Line 31, "type" should read --types--;
Line 32, "surface" should read --surfaces--.

COLUMN 6

Line 32, "$H_{29397\ m}$" should read --$H_{2m}$--;
Line 38, "$C_{mH2m'}$" should read --$C_m \cdot H_{2m'}$--.

UNITED STATES PATENT AND TRADEMARK OFFICE
CERTIFICATE OF CORRECTION

PATENT NO. :  5,686,019

DATED  :  November 11, 1997

INVENTOR(S):  KATSUTOSHI NAKAMURA

It is certified that error appears in the above-identified patent and that said Letters Patent is hereby corrected as shown below:

COLUMN 9

Line 40, "are" should read --and--.

COLUMN 11

Line 25, "and" should read --an--;
Line 29, "as far as" should read --as long as--.

COLUMN 14

Line 25, "according to the present invention" should be deleted;
Line 55, "descried" should read --described--;

COLUMN 15

Line 12, "as far as" should read --as long as--;
Line 57, "format" should read --formats--.

UNITED STATES PATENT AND TRADEMARK OFFICE
CERTIFICATE OF CORRECTION

PATENT NO. : 5,686,019

DATED : November 11, 1997

INVENTOR(S): KATSUTOSHI NAKAMURA

It is certified that error appears in the above-identified patent and that said Letters Patent is hereby corrected as shown below:

COLUMN 16

Line 6, "respectiveness" should read --responsiveness--;

Lines 38-40, " 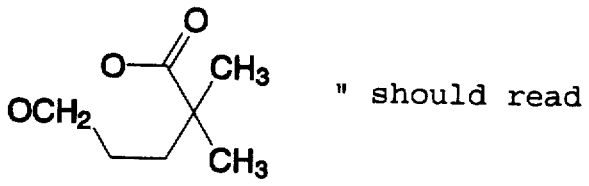 " should read

-- 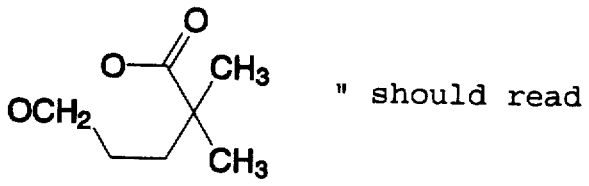 --.

Line 58, "mixture solvent" should read --solvent mixture--.

UNITED STATES PATENT AND TRADEMARK OFFICE
CERTIFICATE OF CORRECTION

PATENT NO. : 5,686,019

DATED : November 11, 1997

INVENTOR(S) : KATSUTOSHI NAKAMURA

It is certified that error appears in the above-identified patent and that said Letters Patent is hereby corrected as shown below:

COLUMN 18

Line 17, "mixture solvent" should read --solvent mixture--.

COLUMN 19

Line 16, "mixture solvent" should read --solvent mixture--;
Line 63, "are" should read --were--.

COLUMN 24

Line 26, "has" should read --showing--.

Signed and Sealed this

Sixteenth Day of June, 1998

Attest:

BRUCE LEHMAN

Attesting Officer

Commissioner of Patents and Trademarks